(12) United States Patent
Yamvrias

(10) Patent No.: US 8,146,881 B2
(45) Date of Patent: Apr. 3, 2012

(54) FASTENER RETAINER BRACKETS

(75) Inventor: Nikolaos A. Yamvrias, Vienna (AT)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 12/874,854

(22) Filed: Sep. 2, 2010

(65) Prior Publication Data

US 2012/0056048 A1    Mar. 8, 2012

(51) Int. Cl.
  *F16M 13/00*  (2006.01)
(52) U.S. Cl. ..................................... 248/551
(58) Field of Classification Search .............. 248/551, 248/220.22, 220.31, 220.41, 220.42, 552; 70/14, 87, 58, 59, 61; 403/263
  See application file for complete search history.

(56) References Cited

U.S. PATENT DOCUMENTS

| | | | | |
|---|---|---|---|---|
| 4,190,221 | A | * | 2/1980 | Updike ........................ 248/551 |
| 4,877,364 | A | | 10/1989 | Sorrentino |
| 5,483,902 | A | * | 1/1996 | Grosch ........................ 108/143 |
| 5,632,584 | A | * | 5/1997 | Acevedo ....................... 411/182 |
| 5,657,893 | A | * | 8/1997 | Hitchings ..................... 220/326 |
| 5,667,187 | A | * | 9/1997 | Doman et al. ................ 248/551 |
| 5,738,020 | A | * | 4/1998 | Correia .......................... 109/51 |
| 5,813,751 | A | * | 9/1998 | Shaffer ..................... 362/249.08 |
| 6,536,730 | B1 | * | 3/2003 | Baer ............................. 248/304 |
| 6,709,182 | B1 | | 3/2004 | De Jong |
| 7,490,838 | B2 | * | 2/2009 | Hyatt et al. ................ 280/47.35 |
| 7,780,372 | B2 | * | 8/2010 | Fattori et al. ..................... 404/2 |
| 2009/0110474 | A1 | * | 4/2009 | Krige ............................ 403/241 |

FOREIGN PATENT DOCUMENTS

| | | |
|---|---|---|
| JP | 2000-074032 | 3/2000 |
| JP | 2000-179526 | 6/2000 |

* cited by examiner

*Primary Examiner* — Ramon Ramirez
(74) *Attorney, Agent, or Firm* — Harness, Dickey & Pierce, P.L.C.

(57) ABSTRACT

Fastener retainer brackets and related assemblies and methods are disclosed. One example fastener retainer bracket includes a mounting portion and a restricting portion coupled to the mounting portion. The mounting portion defines a plurality of openings structured to receive a plurality of fasteners received in a support structure. The restricting portion is adapted to permit tool access to heads of the plurality of fasteners when the plurality of fasteners extend through the plurality of openings of the mounting portion. The restricting portion is adapted to contact the head of at least one of the fasteners to inhibit removal of that fastener from the support structure.

20 Claims, 4 Drawing Sheets

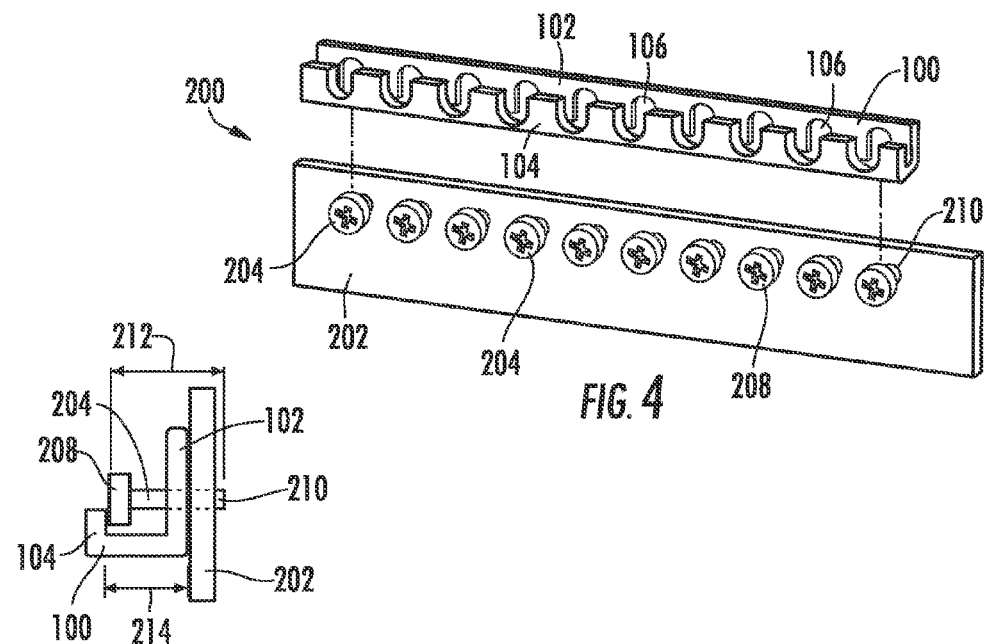
FIG. 4
FIG. 5
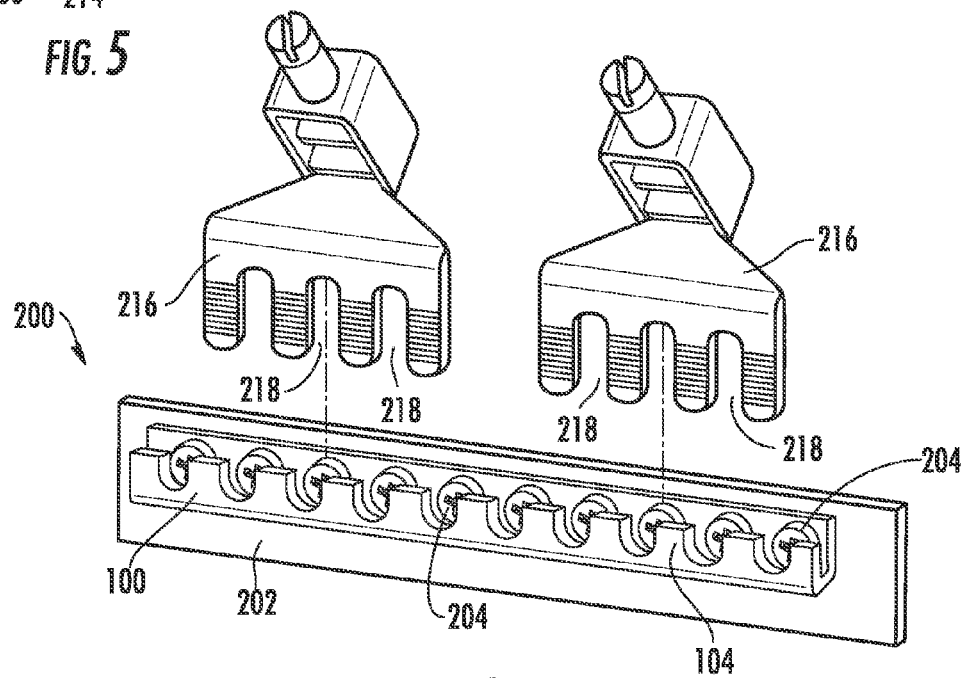
FIG. 6

FASTENER RETAINER BRACKETS

FIELD

The present disclosure relates to fastener retainer brackets and related assemblies and methods.

BACKGROUND

This section provides background information related to the present disclosure which is not necessarily prior art.

Fasteners are commonly used to join multiple components together, or to couple one or more components to a support structure. Various capture devices, including captive fasteners, are also known to prevent complete disengagement and thus removal of a fastener from a support structure, which could otherwise result in loss of the fastener.

SUMMARY

This section provides a general summary of the disclosure, and is not a comprehensive disclosure of its full scope or all of its features.

According to one aspect of the present disclosure, an assembly includes a support structure having a plurality of apertures, a plurality of fasteners each having a head and a shaft, and a retainer bracket having a mounting portion and a restricting portion coupled to the mounting portion. The mounting portion defines a plurality of openings. The plurality of fastener shafts extend through the plurality of openings of the mounting portion and engage the plurality of apertures of the support structure to support the retainer bracket. The restricting portion is adapted to permit tool access to the plurality of fastener heads and inhibit removal of at least one of the fastener shafts from its respective aperture in the support structure.

According to another aspect of the present disclosure, a retainer bracket includes a mounting portion and a restricting portion coupled to the mounting portion. The mounting portion defines a plurality of openings structured to receive a plurality of fasteners received in a support structure. The restricting portion is adapted to permit tool access to heads of the plurality of fasteners when the plurality of fasteners extend through the plurality of openings of the mounting portion. The restricting portion is adapted to contact the head of at least one of the fasteners to inhibit removal of that fastener from the support structure.

According to yet another aspect of the present disclosure, a method is disclosed for using a retainer bracket to retain a plurality of fasteners received in a plurality of apertures of a support structure. The retainer bracket includes a mounting portion defining a plurality of openings and a restricting portion coupled to the mounting portion. The method includes tightening a first one of the fasteners extending through one of the openings in the mounting portion and received in the support structure to inhibit removal from the support structure of a second one of the fasteners extending through another one of the openings in the mounting portion and received in the support structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a left elevation view of the retainer bracket of FIG. 1A.

FIG. 4 is another exploded perspective view of the assembly of FIG. 2.

FIG. 5 is a sectional view taken along line 5-5 in FIG. 2.

FIG. 6 is an exploded perspective view of the assembly of FIG. 2 and two cable fastener terminals.

Corresponding reference numerals indicate corresponding parts throughout the several views of the drawings.

DETAILED DESCRIPTION

Figure 1A:
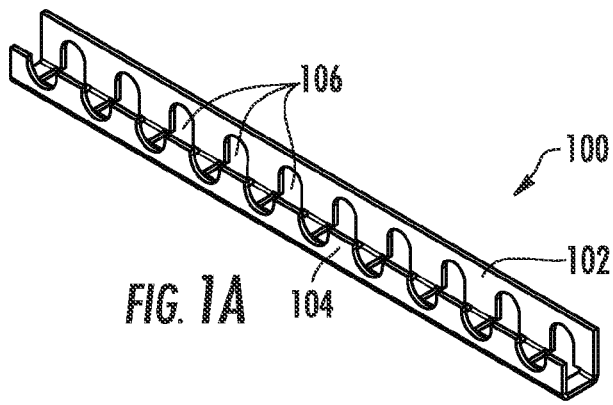
FIG. 1A is an isometric view of a fastener retainer bracket according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, assemblies and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

A fastener retainer bracket according to one example embodiment of the present disclosure is illustrated in FIGS. 1A-1E and indicated generally by reference number 100. The retainer bracket 100 includes a mounting portion 102 and a restricting portion 104 coupled to the mounting portion 102. The mounting portion 102 defines a plurality of openings 106 structured to receive a plurality of fasteners engaged in a support structure. The restricting portion 104 is adapted to permit tool access to heads of the plurality of fasteners when the plurality of fasteners extend through the plurality of openings of the mounting portion 102. The restricting portion 104 is adapted to contact the head of at least one of the fasteners to inhibit removal of that fastener from the support structure.

Figure 1B:
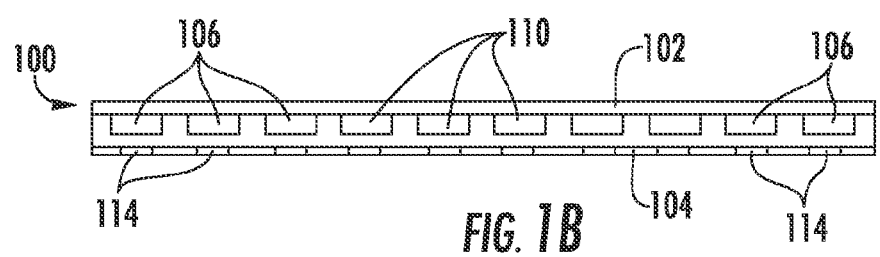
FIG. 1B is a top plan view of the retainer bracket of FIG. 1A.
Figure 1C:
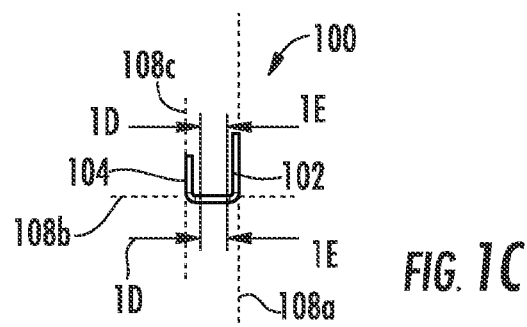
FIG. 1D is a sectional view taken along line 1D-1D in FIG. 10.
FIG. 1E is a sectional view taken along line 1E-1E in FIG. 10.

As shown in FIG. 1C, portions of the retainer bracket 100 lie in different planes 108a-108c. In this example embodiment, plane 108a is perpendicular to plane 108b and parallel with plane 108c. As apparent from FIGS. 1B-D, the openings 106 of the mounting portion 102 are defined in planes 108a and 108b. Alternatively, the openings in the mounting portion 102 may be defined in more or less than two perpendicular or non-perpendicular planes of the retainer bracket 100.

Figure 1D:
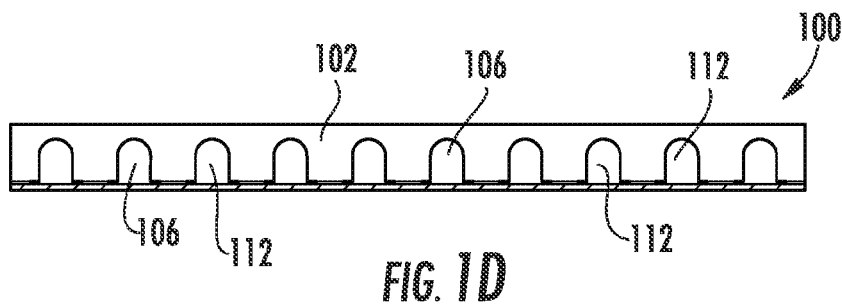

As shown in FIGS. 1B and 1D, each of the openings 106 in the mounting portion 102 includes a fastener head receiving section 110 and a fastener shaft receiving section 112. The fastener head receiving section 110 is structured to receive a head of a fastener, such as a screw, bolt, etc. The fastener shaft receiving section 112 is structured to receive a shaft of a fastener, but not the head of the fastener. In this manner, each opening 106 of the mounting portion 102 is capable of receiving a fastener (including the fastener head) that is already coupled to a support structure. In the example embodiment shown in FIGS. 1A-1E, the mounting portion 102 includes ten openings 106. As should be apparent, however, the number, size(s), shape(s) and position(s) of the openings 106 can be varied as desired for any given implementation of these teachings.

As shown in FIG. 1C, the example retainer bracket 100 has a generally J-shaped cross-section. It should be apparent, however, that a variety of other cross-sectional shapes may be employed without departing from the scope of this disclosure.

Figure 1E:
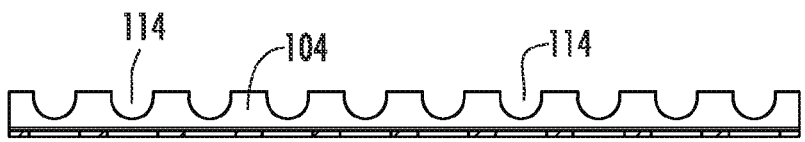

As shown in FIG. 1E, the restricting portion 104 of the retainer bracket 100 defines a plurality of semi-circular openings 114. Each of the openings 114 is aligned with one of the openings 106 of the mounting portion 102. As a result, the openings 114 allow the heads of fasteners extending through the openings 106 to be accessed by a tool (e.g., a screwdriver, wrench, etc.) for tightening or loosening the fasteners from a front side of the retainer bracket 100. Preferably, the openings 114 are smaller than the fastener heads to inhibit removal of the fasteners, especially when at least one of the fasteners is fully engaged to rigidly couple the retainer bracket to a support structure. The number, size(s), shape(s) and position(s) of the openings 114 can be varied as desired for any given implementation of this disclosure.

In the example embodiment shown in FIGS. 1A-1E, the mounting portion 102 and the restricting portion 104 are formed monolithically. Alternatively, the mounting portion 102 and the restricting portion 104 may be formed separately and joined together by any suitable means. Further, the example retainer bracket 100 is preferably made from a substantially rigid material, such as metal, rigid plastic, etc.

Figure 2:
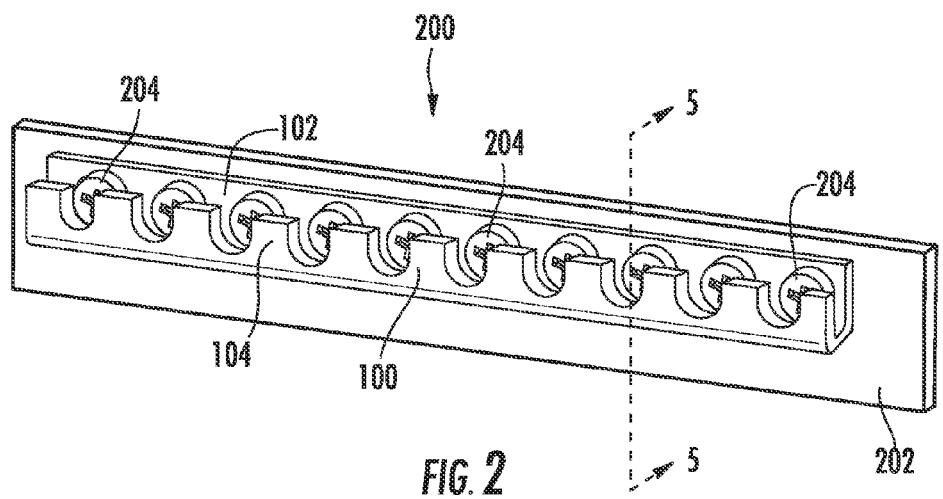
FIG. 2 is a perspective view of an assembly including the retainer bracket of FIG. 1 according to another example embodiment of the present disclosure.
Figure 3:
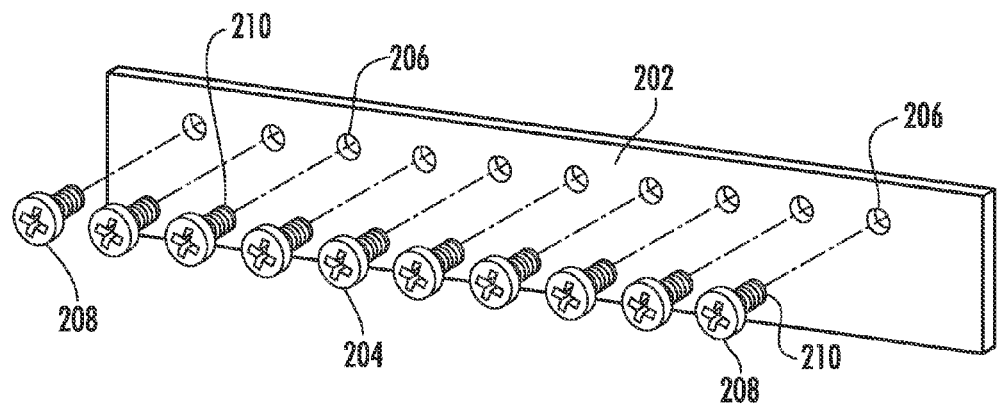
FIG. 3 is an exploded perspective view of a portion of the assembly of FIG. 2.

FIG. 2 illustrates an assembly 200 according to another example embodiment of the present disclosure. The assembly 200 includes a support structure 202, a plurality of fasteners 204, and the retainer bracket 100 described above. As shown in FIG. 3, the support structure 202 defines a plurality of apertures 206. Each fastener 204 has a head 208 and a shaft 210. In this particular example, the fasteners 204 are screws, and the apertures 206 are threaded to receive the screws.

The screws fasteners 204 extend through the openings 106 of the mounting portion 102 and engage the threaded apertures 206 of the support structure 202 to couple the retainer bracket 100 to the support structure 202. As noted above, the restricting portion 104 permits tool access to the fastener heads 208 while inhibiting removal of the fasteners 204 from the apertures 206, especially when at least one of the fasteners 204 is fully engaged to rigidly couple the retainer bracket 100 to the support structure 202.

As shown in FIG. 4, the example retainer bracket 100 may be mounted after the fasteners 204 engage the threaded apertures 206 of the support structure. This is because the fastener head receiving sections 110 of the openings 106 allows the fastener heads 208 to pass therethrough as the retainer bracket 100 is mounted on the fasteners 204 with the fastener shafts 210 received in the fastener shaft receiving sections 112 of the openings 106. Alternatively, if a retainer bracket is used that does not include the fastener head receiving sections 110, the fasteners 204 may need to be inserted through the fastener shaft receiving sections 112 before the fasteners engage the threaded apertures 206 of the support structure.

As shown in FIG. 5, the fastener 204 defines a length 212. The restricting portion 104 is spaced from the support structure 202 by a distance 214. As shown, the distance 214 is less than the length 212 of the fastener 204. In this particular embodiment, the lesser distance 214 positions the restricting portion 104 to inhibit removal of the fastener 204 from the support structure 202.

Figure 7:
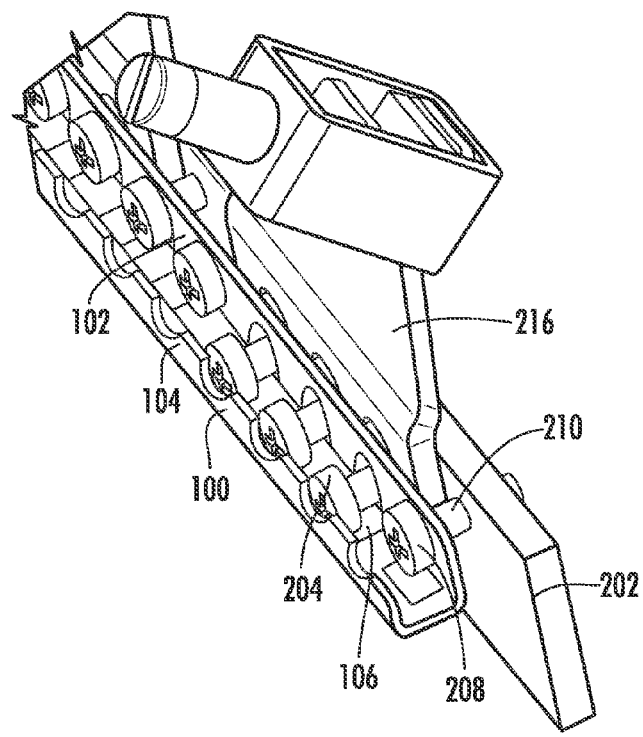
FIG. 7 is a side perspective view of the assembly of FIG. 6.
Figure 8:
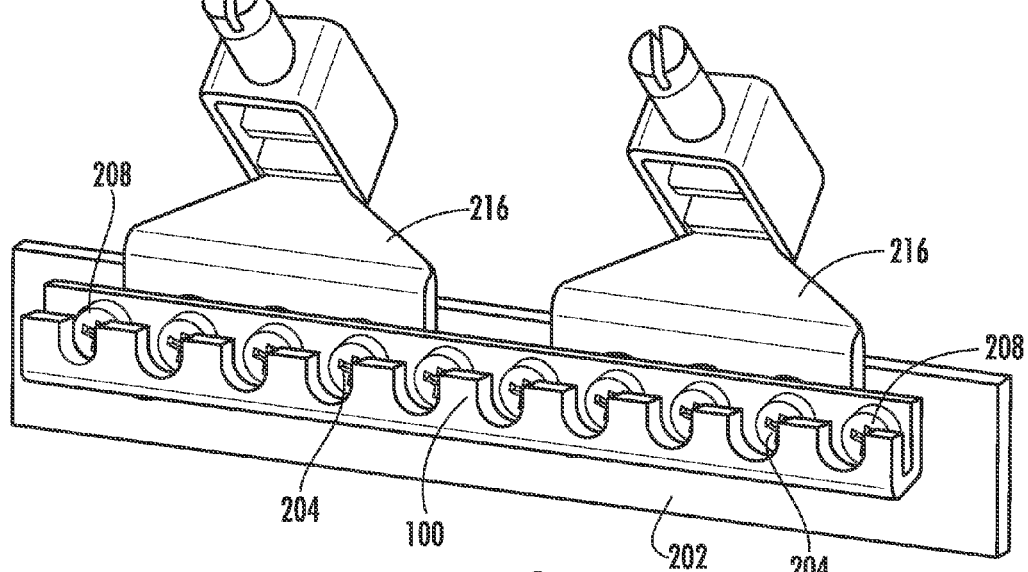
FIG. 8 is a front perspective view of the assembly of FIG. 6 with the fasteners tightened.

In addition to inhibiting removal of the fasteners 204, the retainer bracket 100 may be used to clamp a device between the retainer bracket 100 and the support structure 202. This is illustrated generally in FIGS. 6-8. As shown in FIG. 6, two cable fastener terminals 216 can be inserted between the retainer bracket 100 and the support structure 202, typically after one or more of the fasteners are loosened. In this particular example, each cable fastener terminal 216 includes multiple slots 218. Therefore, the cable fastener terminals 216 can be positioned with the fastener shafts extending through the slots 218, as shown in FIG. 7. The fasteners can then be tightened to rigidly clamp the cable fastener terminals 216 (or other device(s)) between the retainer bracket 100 and the support structure 202, as shown in FIG. 8.

Subsequently, one or more fasteners can be loosened to permit removal of one or both cable fastener terminals 216 (or other clamped device(s)) from between the retainer bracket 100 and the support structure 202. Again, when the fasteners 204 are loosened, the restricting portion 104 of the retainer bracket 100 inhibits removal of the fasteners 204 from the support structure 202.

In the example assembly described above, the support structure is a busbar and the cable fastener terminals 216 are mechanically and electrically coupled to the busbar via the retainer bracket 100, the fasteners 204 and the apertures 206. It should be understood, however, that the teachings of this disclosure are not so limited, and can be applied to a variety of other mechanical and electrical assemblies. Further, while the cable fastener terminals 216 shown in FIGS. 6-8 include screws, it should be understood that other types of fasteners and other configurations of cable fastener terminals may be employed without departing from the scope of this disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. An assembly comprising:
   a support structure having a plurality of apertures;
   a plurality of fasteners, each having a head and a shaft; and
   a retainer bracket having a mounting portion and a restricting portion coupled to the mounting portion, the mounting portion defining a plurality of openings, the plurality of fastener shafts extending through the plurality of openings of the mounting portion and engaging the plurality of apertures of the support structure to support the retainer bracket, the restricting portion adapted to permit tool access to the plurality of fastener heads and inhibit removal of at least one of the fastener shafts from its respective aperture in the support structure.

2. The assembly of claim 1 wherein each of the openings of the mounting portion includes a fastener shaft receiving section and a fastener head receiving section, the fastener head receiving section permitting the retainer bracket to be mounted on the plurality of fasteners when the plurality of fasteners are received in the plurality of apertures of the support structure.

3. The assembly of claim 2 wherein the mounting portion includes at least first and second substantially perpendicular planes, wherein the fastener shaft receiving sections are defined in the first plane of the mounting portion, and wherein the fastener head receiving sections are defined in the second plane of the mounting portion.

4. The assembly of claim 3 wherein the retainer bracket has a monolithic construction.

5. The assembly of claim 4 wherein the retainer bracket has a generally J-shaped cross-section.

6. The assembly of claim 1 wherein said at least one fastener has a length, and wherein the restricting portion is spaced from the support structure by a distance less than the length of said at least one fastener.

7. The assembly of claim 1 further comprising a device clamped between the retainer bracket and the support structure.

8. The assembly of claim 7 wherein the device includes at least one slot and at least one of the fasteners extends through said at least one slot.

9. The assembly of claim 7 wherein the support structure comprises an electrically conductive busbar, and wherein the device comprises a cable fastener terminal.

10. A retainer bracket comprising a mounting portion and a restricting portion coupled to the mounting portion, the mounting portion defining a plurality of openings structured to receive a plurality of fasteners received in a support structure, the restricting portion adapted to permit tool access to heads of the plurality of fasteners when the plurality of fasteners extend through the plurality of openings of the mounting portion, the restricting portion adapted to contact the head of at least one of the fasteners to inhibit removal of said fastener from the support structure.

11. The retainer bracket of claim 10 wherein the mounting portion defines at least first and second substantially perpendicular planes, and wherein each of the openings is defined in the first and second planes.

12. The retainer bracket of claim 10 wherein each of the openings of the mounting portion includes a fastener shaft receiving section and a fastener head receiving section.

13. The retainer bracket of claim 12 wherein the retainer bracket has a generally J-shaped cross-section and wherein each of the openings extends in at least two perpendicular planes of the generally J-shaped cross-section.

14. The retainer bracket of claim 13 wherein the restricting portion defines a plurality of openings aligned with the openings in the mounting portion.

15. The retainer bracket of claim 14 wherein the retainer bracket has a monolithic construction.

16. A method of using a retainer bracket to retain a plurality of fasteners received in a plurality of apertures of a support structure, the retainer bracket including a mounting portion defining a plurality of openings and a restricting portion coupled to the mounting portion, the method comprising tightening a first one of the fasteners extending through one of the openings in the mounting portion and received in the support structure to inhibit removal from the support structure of a second one of the fasteners extending through another one of the openings in the mounting portion and received in the support structure.

17. The method of claim 16 further comprising inserting the plurality of fasteners through the plurality of openings defined in the mounting portion to support the retainer bracket from the plurality of fasteners received in the support structure.

18. The method of claim 17 wherein each of the plurality of fasteners includes a head and a shaft and wherein each of the openings of the mounting portion includes a fastener shaft receiving section to receive the shaft of its respective fastener and a fastener head receiving section to receive the head of its respective fastener.

19. The method of claim 18 further comprising positioning a device between the retainer bracket and the support structure to clamp the device between the retainer bracket and the support structure.

20. An assembly comprising:
    a support structure;
    a plurality of fasteners, each having a head and a shaft; and
    a retainer bracket having a mounting portion and a restricting portion coupled to the mounting portion, the mounting portion defining a plurality of openings, the plurality of fastener shafts extending through the plurality of openings of the mounting portion and into the support structure to support the retainer bracket, the restricting portion adapted to permit tool access to the plurality of fastener heads and inhibit removal of at least one of the fastener shafts from the support structure.

* * * * *

UNITED STATES PATENT AND TRADEMARK OFFICE
CERTIFICATE OF CORRECTION

PATENT NO. : 8,146,881 B2  Page 1 of 1
APPLICATION NO. : 12/874854
DATED : April 3, 2012
INVENTOR(S) : Nikolaos A. Yamvrias It is certified that error appears in the above-identified patent and that said Letters Patent is hereby corrected as shown below:

IN THE SPECIFICATIONS:

At column 2, line 12, replace "10" with "1C"

At column 2, line 15, replace "10" with "1C"

At column 2, line 17, replace "10" with "1C"

Signed and Sealed this
Twenty-sixth Day of June, 2012

David J. Kappos
*Director of the United States Patent and Trademark Office*